United States Patent
Singla et al.

(10) Patent No.: US 12,321,256 B1
(45) Date of Patent: Jun. 3, 2025

(54) BEHAVIOR DATA DRIVEN AUTOMATION TEST CODE GENERATING SYSTEM AND METHOD

(71) Applicant: Morgan Stanley Services Group Inc., New York, NY (US)

(72) Inventors: Neha Singla, Karnataka (IN); Utsav Galphat, Karnataka (IN); Kanwar deep Singh, Karnataka (IN); Abhinav Bansal, Scotland (GB); Diptanu Nath, Karnataka (IN); Naeem Mushtaq, London (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/055,944

(22) Filed: Feb. 18, 2025

(51) Int. Cl.
G06F 11/3668 (2025.01)
G06F 11/3698 (2025.01)

(52) U.S. Cl.
CPC ...... *G06F 11/3684* (2013.01); *G06F 11/3698* (2025.01)

(58) Field of Classification Search
None
See application file for complete search history.

(56) References Cited

U.S. PATENT DOCUMENTS

| | | | |
|---|---|---|---|
| 10,230,571 B2 | 3/2019 | Rangasamy et al. | |
| 10,437,712 B1 | 10/2019 | Tyler et al. | |
| 10,838,846 B1* | 11/2020 | Saleh-Esa | G06F 11/3698 |
| 11,392,486 B1 | 7/2022 | Vadaparty et al. | |
| 2011/0246967 A1 | 10/2011 | Garavaglia, Jr. | |
| 2014/0032637 A1 | 1/2014 | Weir | |
| 2015/0100831 A1* | 4/2015 | Nanjundappa | G06F 11/3688 714/38.1 |
| 2015/0178182 A1 | 6/2015 | Mallya | |
| 2015/0309917 A1 | 10/2015 | Wang | |
| 2015/0378872 A1* | 12/2015 | Kim | G06F 11/3688 717/124 |
| 2018/0217920 A1 | 8/2018 | Bhojan | |
| 2020/0117584 A1 | 4/2020 | Maseedu et al. | |

(Continued)

OTHER PUBLICATIONS

Digital Mars, "Lesson 2: Generate an Application Framework", 2018, Published at https://digitalmars.com/ugr/chapter11.html (Year: 2018).*

*Primary Examiner* — Hossain M Morshed
(74) *Attorney, Agent, or Firm* — Leason Ellis LLP

(57) ABSTRACT

Computer-implemented agile software development, testing, and implementation are provided. At least one computing device accesses at least one input file and processes the file(s) to generate an application framework including a plurality of files. An interactive interface including selectable options associated with the respectively accessible folders is provided. Via the interactive interface, editable access to each of the plurality of files is provided and the at least one computing device receives, via the interface, at least one edit to at least one of the files. A testing case of the generated application framework is generated, includes step definition files. The at least one computing device tests the generated application framework by stepping through automation provided by the generated application framework as a function of the step definition files. Moreover, the at least one computing device generates reporting associated with the testing of the generated application framework.

20 Claims, 19 Drawing Sheets

(56) References Cited

U.S. PATENT DOCUMENTS

| | | |
|---|---|---|
| 2020/0327043 A1 | 10/2020 | Dyavappa et al. |
| 2020/0379891 A1 | 12/2020 | Canter |
| 2021/0089436 A1 | 3/2021 | Gangina |
| 2021/0096978 A1 | 4/2021 | Stump et al. |
| 2021/0109904 A1 | 4/2021 | Kasi et al. |
| 2021/0157551 A1* | 5/2021 | Bliss .................... G06F 40/216 |
| 2021/0232494 A1 | 7/2021 | Chatterjee et al. |
| 2022/0100643 A1* | 3/2022 | Storck ................. G06F 11/3698 |
| 2022/0206932 A1 | 6/2022 | Samal et al. |
| 2022/0276950 A1 | 9/2022 | Raka et al. |
| 2022/0300400 A1 | 9/2022 | Bikkina et al. |
| 2023/0056233 A1 | 2/2023 | Kumar |
| 2023/0120416 A1 | 4/2023 | Tarasenko et al. |
| 2023/0185700 A1 | 6/2023 | Wong |
| 2023/0315615 A1 | 10/2023 | Zong et al. |
| 2023/0342286 A1 | 10/2023 | Qian et al. |
| 2024/0419406 A1* | 12/2024 | Wang ....................... G06F 8/20 |

\* cited by examiner

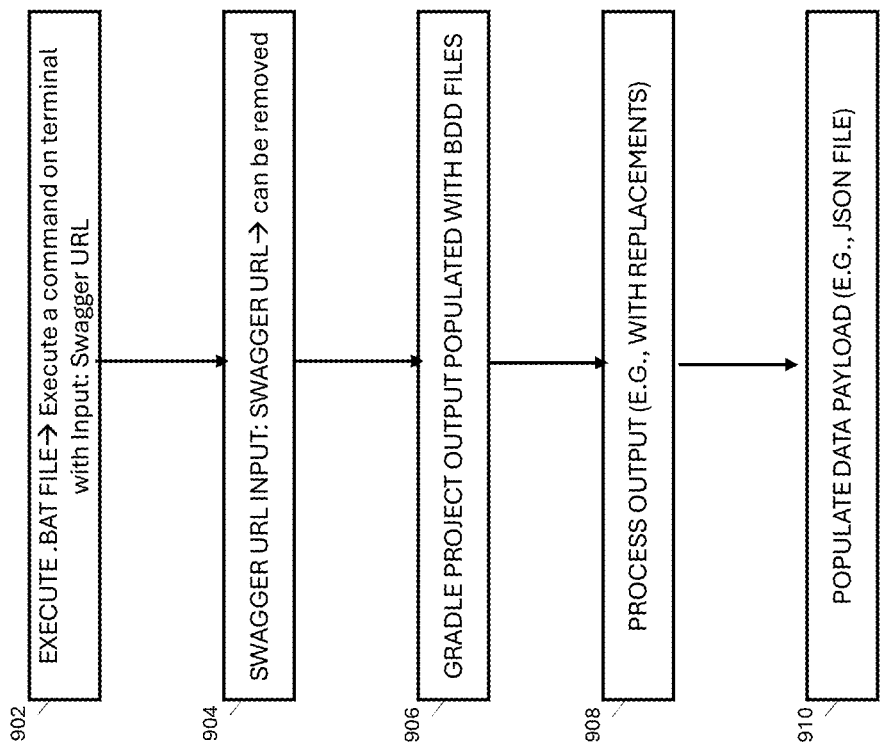

BEHAVIOR DATA DRIVEN AUTOMATION TEST CODE GENERATING SYSTEM AND METHOD

FIELD

The present disclosure relates, generally, to computer technology and, more particular, to behavior data driven automation development, testing, and implementation.

BACKGROUND

Agile computer application development is often employed to meet production needs in an effective, flexible, collaborative, and efficient working environment involving personnel associated with customers and developers. In operation, customer requirements are identified and plan development is prioritized, which improves timing associated with programming, testing, and implementing, in view of iterative development cycles, interaction between participants, and automation.

Agile computer application development and operations can include a RESTful application programming interface ("API"), which generally refers to a uniform interface that enables two computer systems to exchange information securely over the internet. Further, the principles with representational state transfer (REST) constraints for creating web services can be defined. RESTful APIs are widely used for their simplicity, flexibility, and efficiency. Key principles of RESTful APIs can include a uniform interface, statelessness, and a layered system. The uniform interface ensures that information transferred by a server is in a standard format, referred to herein, generally, as a representation, which can differ from an internal representation on the server. For example, a server can store data as text, convert the text and transmit it as HTML.

Furthermore, each client request in a REST architecture is independent of previous requests and, accordingly, a server does not retain any client state between requests. Statelessness improves the ability to make a system scalable and manageable. Moreover, a layered system provides client connectivity to authorized one or more intermediaries.

Behavior driven development ("BDD") software development lifecycle in the enterprise can include computing device interactions within and between quality assurance (QA) teams and software development engineering test (SDET) teams, programming development teams, and production teams. Unfortunately, implementation backlogs in one or more of these teams, for example, due to manual or limited automation can cause an inability to meet timelines associated with development sprints, leading to increases in programming delays and operational bugs.

It is with respect to these and other considerations that the disclosure made herein is presented.

BRIEF SUMMARY

The present disclosure includes systems and methods for computer-implemented agile software development, testing, and implementation. In one or more implementations, at least one computing device, configured by executing programming instructions stored on processor, accesses at least one input file. The at least one computing device processes the at least one input file to generate an application framework including a plurality of files, wherein the plurality of files are arranged in respectively accessible folders. Further, the at least one computing device provides an interactive interface including selectable options associated with the respectively accessible folders for editable access to the plurality of files. The at least one computing device provides, by via the interactive interface, editable access to each of the plurality of files and receives, via the interactive interface, at least one edit to at least one of the plurality of files. Moreover, the at least one computing device generates a testing case of the generated application framework, wherein the testing case includes step definition files. The at least one computing device tests the generated application framework by stepping through automation provided by the generated application framework as a function of the step definition files. Moreover, the at least one computing device generates reporting associated with the testing of the generated application framework.

In one or more implementations of the present disclosure, the generated application framework includes at least one of a data payload, an application programming interface, and a schema.

In one or more implementations of the present disclosure, the data payload is formatted in a JSON file and the application programming interface includes representation state transfer.

In one or more implementations of the present disclosure, the application programming interface is generated using SWAGGER.

In one or more implementations of the present disclosure, the at least one computing device generates a plurality of feature files including at least two of: an actuator feature; a dashboard controller feature; a delegated-reporting controller feature; an enterprise data governance search controller feature; an entitlements controller feature; a feature flag controller feature; a metadata controller feature; a party coded controller feature; a party manager controller feature; a virtual assistant controller feature; and a workspace controller feature.

In one or more implementations of the present disclosure, the application framework is generated as a function of a command line interface and the input file.

In one or more implementations of the present disclosure, the at least one computing device provides, as a function of the generated application framework and the testing case, metrics traceability.

In one or more implementations of the present disclosure, the at least one computing device provides, as a function of the generated application framework and the testing case, schema verification.

In one or more implementations of the present disclosure, the at least one computing device adds, as a function of the testing case, assertions to the generated application framework.

In one or more implementations of the present disclosure, the generated application framework is a GRADLE project.

BRIEF DESCRIPTION OF THE DRAWINGS

Aspects of the present disclosure will be more readily appreciated upon review of the detailed description of its various embodiments, described below, when taken in conjunction with the accompanying drawings, of which:

FIG. 9 is a high-level flow chart illustrating example steps that are associated with BDD automation generation, testing, and implementation in accordance with an example implementation of the present disclosure;

DETAILED DESCRIPTION

Figure 1:
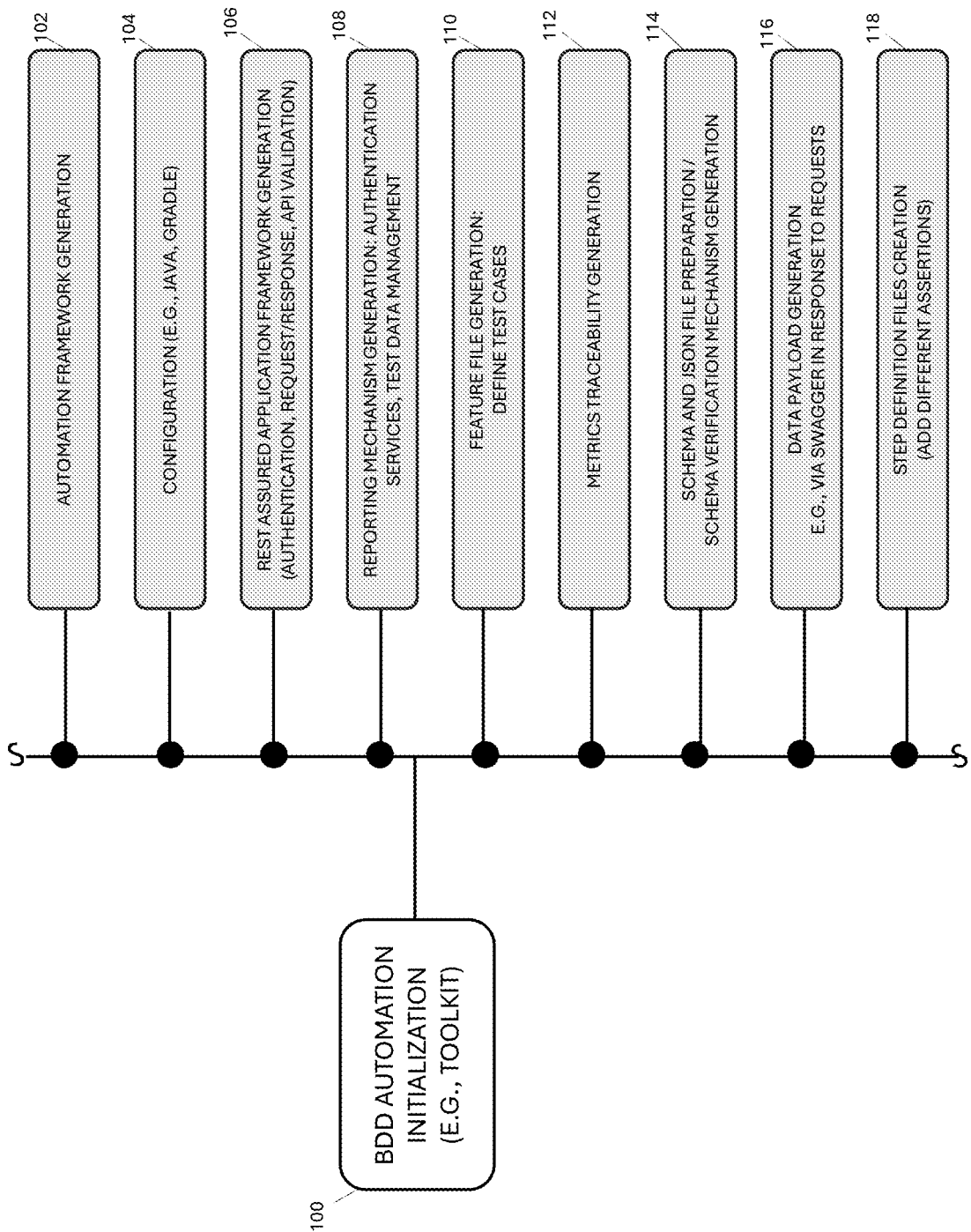
FIG. 1 is a block diagram illustrating operational modules in accordance with an example implementation of the present disclosure.

By way of introduction, the present disclosure provides systems and methods for developing and implementing complex behavior driven development ("BDD") automated testing applications. One or more computing devices can be specially configured to provide an interactive interface and generation tool (referred to herein, generally, as a "toolkit") that includes BDD application framework development, testing, implementation, and integration. Assembling and customizing a collection of respective programming environment automation features offered by the present disclosure provides for seamless creation of automation, e.g., REST-assured automation, including data processing operations offered in CUCUMBER JAVA and generation, execution, and testing of GHERKIN feature files in improved streamlined ways. Further, implementations can include step automation, thereby simplifying testing measures.

The combination of features set forth in the present disclosure provides a technical framework that is robust and adaptable to generate automation, including for testing and operations in discreet applications. For example, build implementation tools, such as GRADLE can be included via the interactive toolkit for API testing, such as API schema validation to ensure integrity of an API in respective computing environments. Moreover, metrics integration can track efforts and progress of automation. Software testing metrics can be vital for team members in agile software development, including developers, testers, quality assurance personnel, and project managers. Activities can be measured, reported, and tracked, thereby ensuring improved testing as a function of respective software testing metrics. In one or more implementations of the present disclosure, an initial automation testing process, which significantly reduces manual setup and steps that would otherwise be required by users. An initial testing process can be provided automatically, requiring some user follow-up activity that is significantly less than would be required, for example, had the user performed an entire testing process manually. One or more testing frameworks can be provided, for example, in non-production working environments, development environments, testing environments, and Q&A environments. A framework can implemented a part of an end-result, which can be downloaded and implemented in one or more users' systems, including stored and use, for example, via a software configuration management tool, such as GITHUB/BITBUCKET.

Other technologies can be supported by the present disclosure, such as for security, modeling and other technological tools, such as for creating generative algorithms, web automation, API development, and development and application lifecycle.

In one or more implementations of the present disclosure, programming code (e.g., PYTHON script(s)) can be executed in one or more computing devices to process a SWAGGER API document uniform resource locator ("URL") as an input and generate a BDD automation project in response. Automatic processing in accordance with the teachings herein ensures automation projects are configured with required and properly configured feature files, including all end points. Further, the features shown and described herein can configure automation projects with step definition files, data payloads, schemas, run configurations, reporting mechanisms, and test metrics integration.

In one or more implementations of the present disclosure, one or more interactive interface and generation tools are configured for simple and automatic use (e.g., in a form of a .bat file). When executed, an independent GRADLE project configured with required files can be created, thereby providing significant flexibility. Implementations can include modifying test cases, such as on a per application needed basis. Using the features shown and described herein, automation projects can be developed that provide automation for testing and operations can check code and start use of the automation code daily. For example, a research data management project developed in accordance with the teachings herein is ready for production in the enterprise following automatic testing and operations provided by the one or more interactive interface and generation tools shown and described herein.

In an example implementation, feature files, JSON payloads, and schemas can be generated automatically as a function of modules provided in the one or more interactive interface and generation tools. For example, feature files can include, among others, an actuator feature, a dashboard controller feature, a delegated-reporting controller feature, an enterprise data governance ("EDG") search controller feature, an entitlements controller feature, a feature flag controller feature, a metadata controller feature, a party coded controller feature, a party manager controller feature, virtual assistant controller feature, and a workspace controller feature. Moreover, data payloads can be provided in, for example, JSON files and can regard case details, data entry display form data, data entry display form actions, or the like. Schema payload data can be transferred via JSON files including, for example, providing an audit history schema, a bulk operation status schema, a reporting details schema, a document identifiers schema, among others in particular implementations. Feature files can be generated containing, for example, possible test cases with respective data.

In addition, different controllers can be supported, each controller configured for having its own create, read, update and delete ("CRUD") operations. An application can have, for example, multiple controllers and each controller can have any number of operations. Further, each controller can have a separate feature file, and each feature file can have all possible test cases for a respective controller.

For example, an application can have a controller, entitled "user." The application can provide access to create user, update user details, or delete user. In accordance with the present disclosure, user-feature file is provided which contains all test cases for any user.

In operation, a feature file can contain possible test cases with respective data. For example, testing automation can verify methods including post methods, get methods, delete methods, or the like, and schemas can be selected, such as in the event respective data payloads exist in connection with respective methods. Still further, data folder structures can be defined, for example, for managing (e.g., storing, copying, accessing, deleting) feature files, as well as for QA results, and for schemas. Moreover, folders can be defined for projects, such as for a test automation framework.

Accordingly, as shown and described herein, the present disclosure reduces significant amounts of time and ensures accurate and consistent agile software development.

Referring now to the drawings, FIG. 1 is a block diagram illustrating operational modules in accordance with an example implementation of the present disclosure. The combination of technological features set forth herein, including, or associated with, the modules set forth in FIG. 1, identifies and implements solutions to technical shortcomings in agile software development. The present disclosure addresses and resolves, for example, accumulated backlogs of automation tasks, gaps in accountability, and issues with efficiency and resource allocation, which can result in barriers to collaboration. The present disclosure streamlines the automation development process, including as a function of a tool that includes an interactive interface and processes information to generate comprehensive BDD Java automation suites. Example features and operations include automation framework generation 102, with features like GHERKIN file creation, step definition generation for robust framework creation. BDD flexibility allows for virtually any language and terminology. In one or more implementations, adherence to specific keywords is used, which increases the ability for users to relate to respective tasks and descriptions.

Continuing with reference to FIG. 1, the toolkit 100 can provide a module 104 for program and file configurations, such as to update JAVA and GRADLE files. API schema validation, integrated metrics, and pre-loaded tools. This results in seamless, efficient, and collaborative automation development for Agile teams. Accordingly, the present disclosure provides technical solutions to address technical problems in the realm of software development and automation, thereby improving computer system technology. Continuing with reference to FIG. 1, REST API automation testing can be generated 106, such as for authentication, testing requests/responses, and validating APIs. In addition, reporting generation 108, testing and results can be provided, such as relating to authentication services and data management services.

The configurations shown and described herein significantly reduce time and effort otherwise required for BDD automation framework development supporting virtually any programming language environment, including for generating test cases. For example, the present disclosure automates generation of BDD JAVA automation suites, for example, and GHERKIN feature files (110). Metrics traceability 112 provides can track efforts and progress of automation. Further, schema and JSON preparation 114 can be streamlined that is consistent and standardized, thereby ensuring accuracy and reliability across different teams and projects (e.g., development, programming, testing, etc.). Further, data payload generation 116, such as via SWAGGER in response to request(s) can be provided automatically and step definition files generation 118 for stepping through automation. As a function of the step definition generation, assertions can be added.

The features shown and described herein, including modules set forth in toolkit 100, improve consistency in a unified approach to automation development, testing, and operation across departments or divisions within an organization. Technical features improving efficiency and speed include step definitions and BDD frameworks, dependency management, and metrics integration. Moreover, dependencies, such as GRADLE versions, can be managed to automatically resolve dependencies and other issues and provide increasingly stable and reliable automation reducing the likelihood of errors related to dependency management. Moreover, integrated metrics provide teams with a clear view of automation progress, which not only helps in tracking the efficiency of the automation process but also enables data-driven decision-making for further improvements. For example, data can be generated, stored, and accessed representing executions over time and occurrences thereto, enabling users to draw relevant key performance indicators ("KPIs") for a given team Still further, inclusion of pre-loaded tools such as CUCUMBER APIs for results, SONAR, GRADLE, GRASSHOPPER, and SELENIUM UI can simplify testing and reporting processes, in which these and other tools can be leveraged to enhance capabilities of an automation framework. In one or more implementations, SWAGGER can be taken as input via a common line interface (CLI), and used to generate automatically test cases, frameworks, and files streamlines the setup process. This reduces the potential for manual errors and ensures a swift and error-free initiation of the automation process. Moreover, the present disclosure facilitates agile testing by addressing common challenges associated with agile programming development, such as backlog accumulation, accountability issues, and resource allocation struggles. The technology shown and described herein contributes to an agile and responsive testing process which, in turn, supports overall agility of software development life cycle. The invention leverages automation to tackle technical challenges associated with the creation and maintenance of test automation frameworks, making the entire process more efficient, consistent, and integrated within the broader context of computer system operations.

Figure 2:
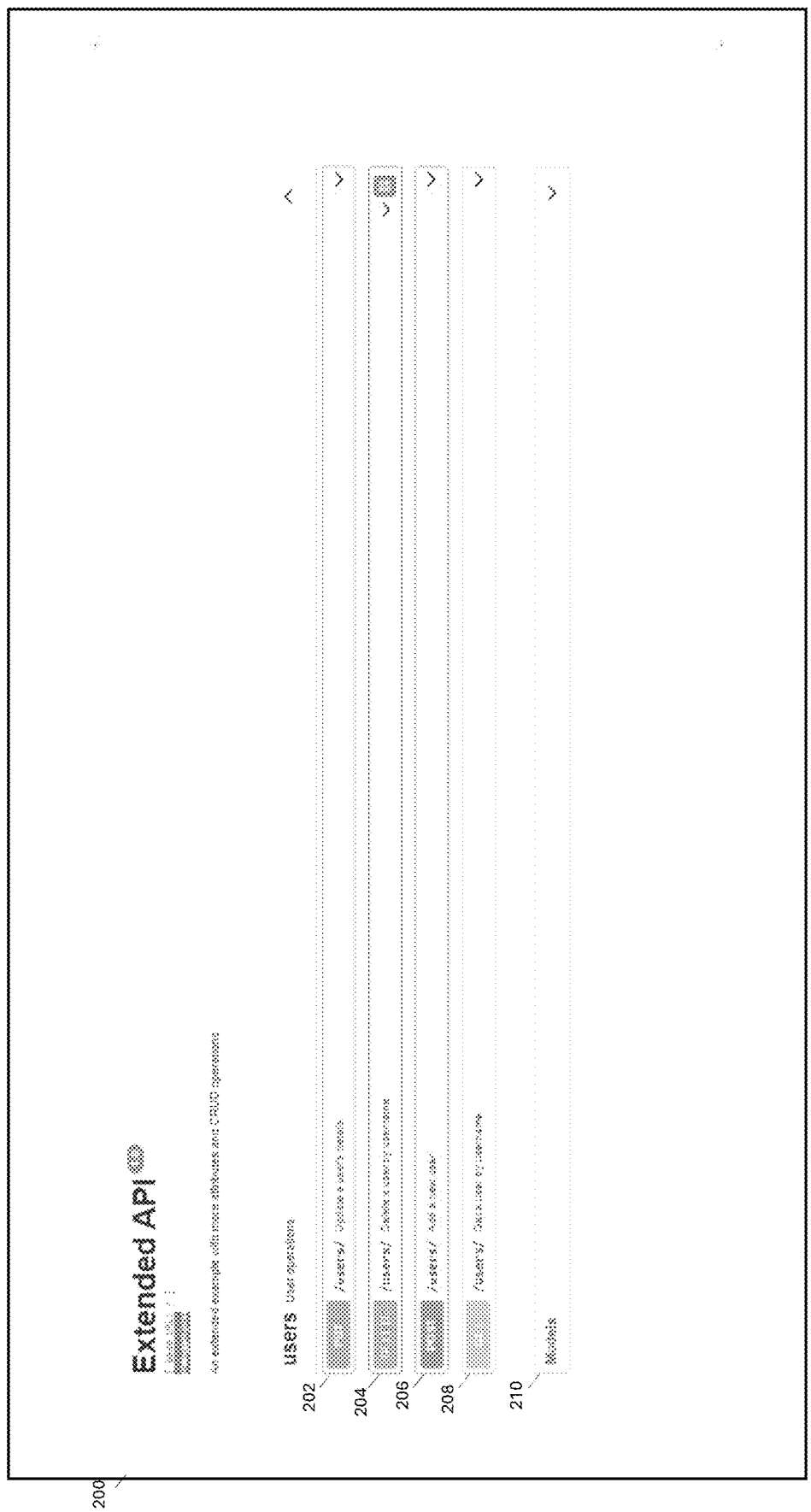
FIG. 2 illustrates an example implementation that includes functions, such as create, read, update, and delete functions, in connection with example implementation of the present disclosure.

FIG. 2 illustrates an example implementation that includes functions, such as create, read, update, and delete ("CRUD") functions in connection with automated testing in accordance with a BDD automation testing project. In the example shown in FIG. 2, shows an example data entry display screen 200 including selectable controls (e.g., drop-down lists) in connection with an example extended API that uses data payload (e.g., in a SWAGGER.JSON) as a base URL for an input. Selectable user operations are provided in display screen 200, include drop-down list options corresponding to respective CRUD user operations associated with users. In the example shown in PUT operation option 202 is provided that, when selected, supports updates to user details. Further, DELETE option 204, when selected, supports deleting a user, for example, by username. POST option 206, when selected supports adding a new user and GET option 208 retrieves a user, for example, by username. Further, model option 210, when selected, enables users to select a respective model.

In operation, status codes can be generated as output following various operations provided in accordance with the teachings herein. For example, status codes in SWAGGER can be incorporated and the present disclosure supports a separate test case for each status respective status code. For example, any user creation can return a status code of "201," a user update can return "200," a user retrieval can return "203," and user deletion can return 205. Of course, one of ordinary skill will recognize that many different kinds of status codes and values associated therewith can vary in accordance with respective implementations.

Figure 3:
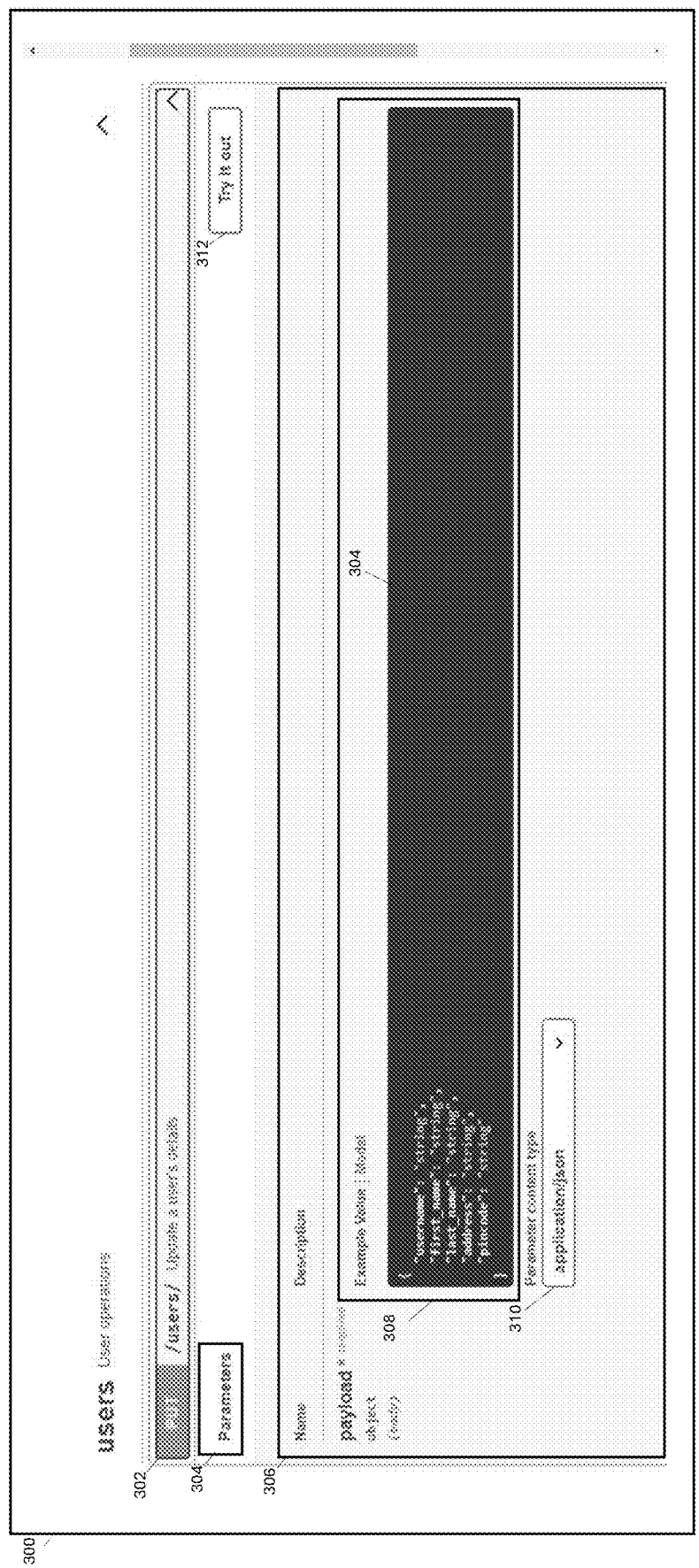
FIG. 3 is a computing device display screen illustrating options for user parameters associated with a payload, in accordance with an example implementation of the present disclosure.
Figure 4:
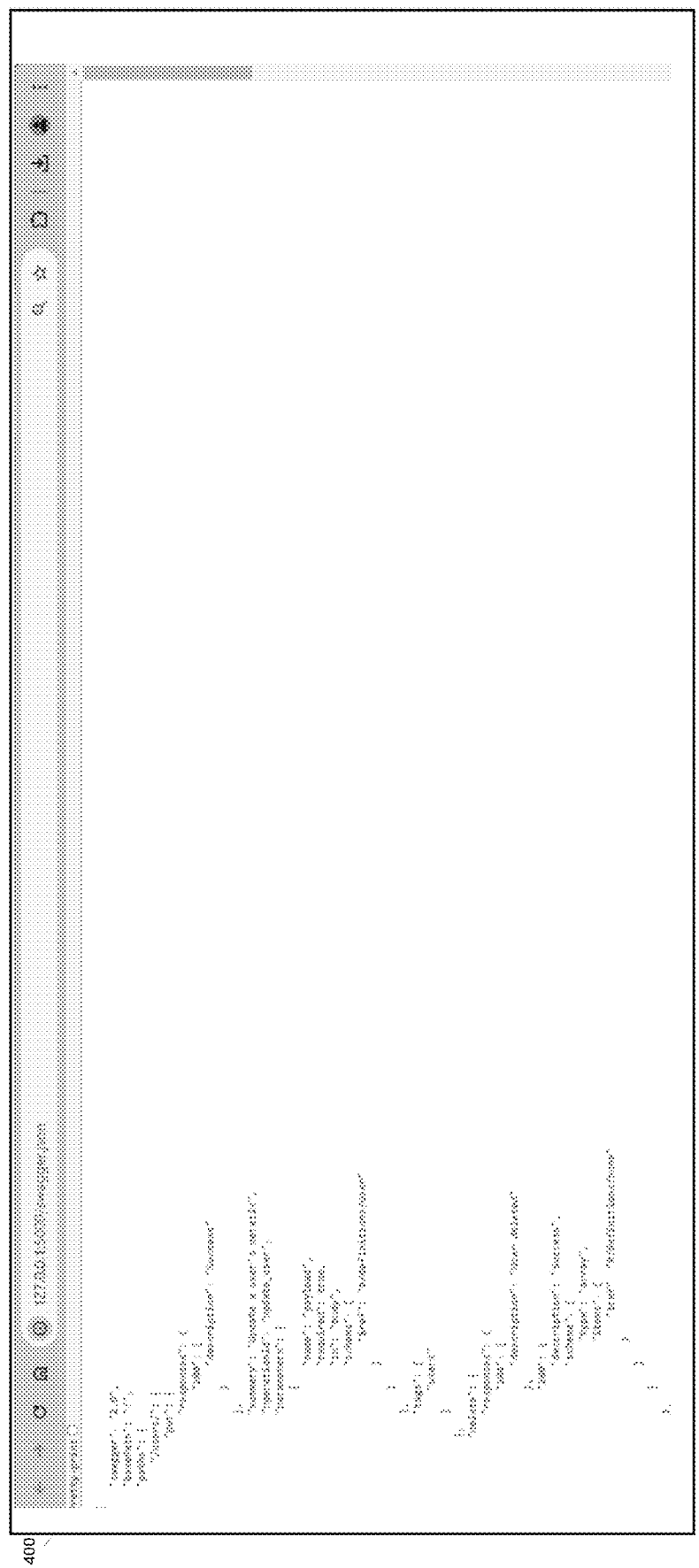
FIG. 4 shows an example display screen for generating a data payload, in accordance with an example implementation of the present disclosure.

FIG. 3 is a computing device display screen 300 illustrating options for user parameters associated with a payload, corresponding to PUT option 302. In the example implementation shown in FIG. 2, selectable parameter content type option 302 is included and JSON has been selected. Parameter section 304 includes parameters formatted for the respective data model, JSON in FIG. 3, corresponding to PUT option 302. Also illustrated in FIG. 3 is display section 306, which includes a data payload description and an example data payload body 308. In the example display section 306, the selected parameter content in dropdown list 310 is JSON, which is reflected in data payload body 308. Moreover, graphical control 312 (shown as "Try it out" button), when selected, enables configuring and editing, such as shown in display screen 400 (FIG. 4), which illustrates example SWAGGER for generating a JSON data payload.

Figure 5:
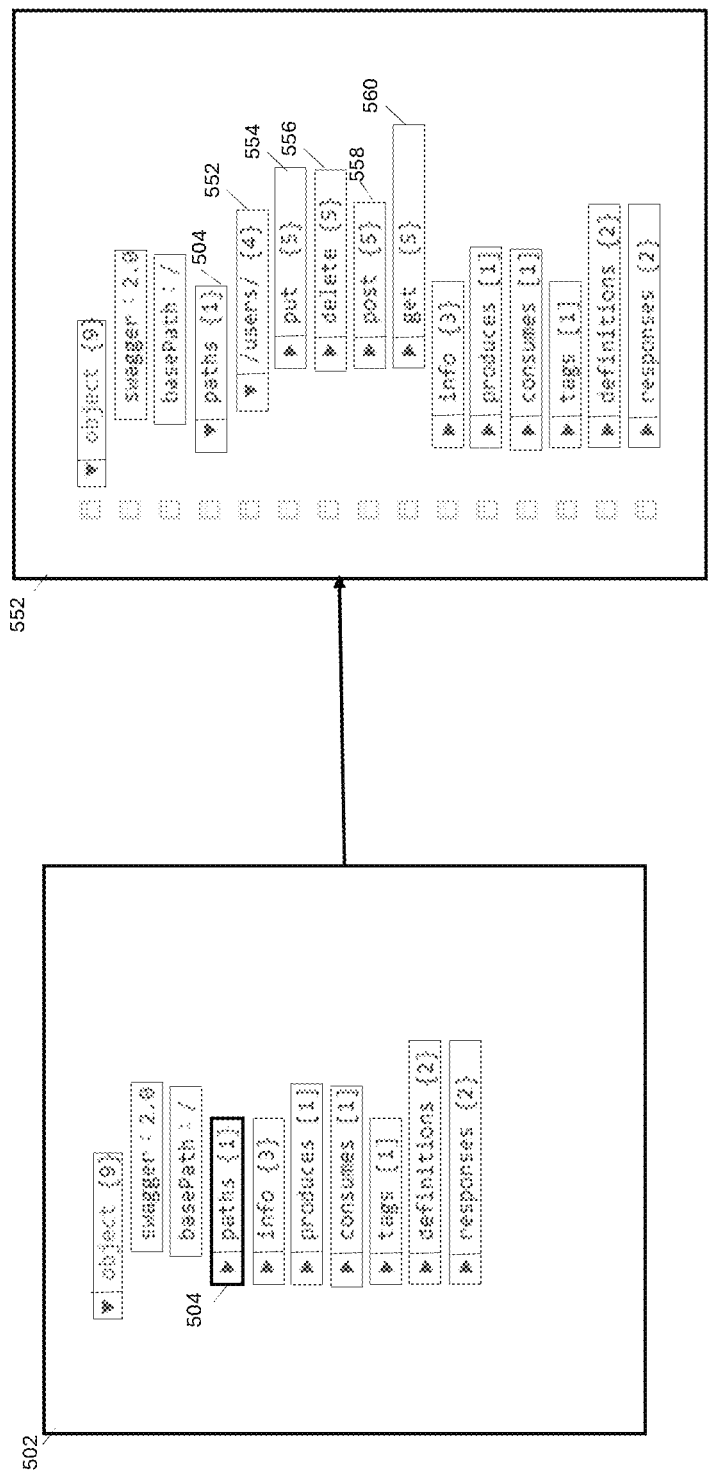
FIG. 5 illustrates an example interface in a first state in which a paths option has not yet been selected, and in a second state in which the paths options has been selected, in accordance with an example implementation of the present disclosure.

The present disclosure includes one or more user interfaces that can be provided, for example, for selecting and accessing functionality provided with modules, such as shown and described herein. A navigational graphical user interface is provided in connection with application framework generation, and includes nine object categories, including SWAGGER, base path, paths, information, produces, consumes, tags, definitions, and responses. Further, values are provided indicating a number of objects that are respectively associated with each of the categories. Dropdown lists are included for access to the objects associated with each of the categories. As illustrated in FIG. 5, object section 502 illustrates an interface in a first state in which the paths option 504 has not yet been selected. Object section 552 illustrates the interface in a second state, in which the paths option 504 has been selected, in which the one associated object, users sub-option includes the four respective CRUD user operations (FIG. 2), including PUT 554, DELETE 556, POST 558, and GET 560. Each of the user operations has 5 associated objects (not shown).

FIGS. 6A-6E illustrate example display screens associated with BDD AUTOMATION INITIALIZATION toolkit 100, each associated with BDD generation and displaying a respective state of an interface in accordance with one or more example implementations of the present disclosure. In one or more implementations of the present disclosure, pre-loaded tools can be provided, such as CUCUMBER APIs, SONAR, GRADLE, GRASSHOPPER, and SELENIUM UI.

Figure 6A:
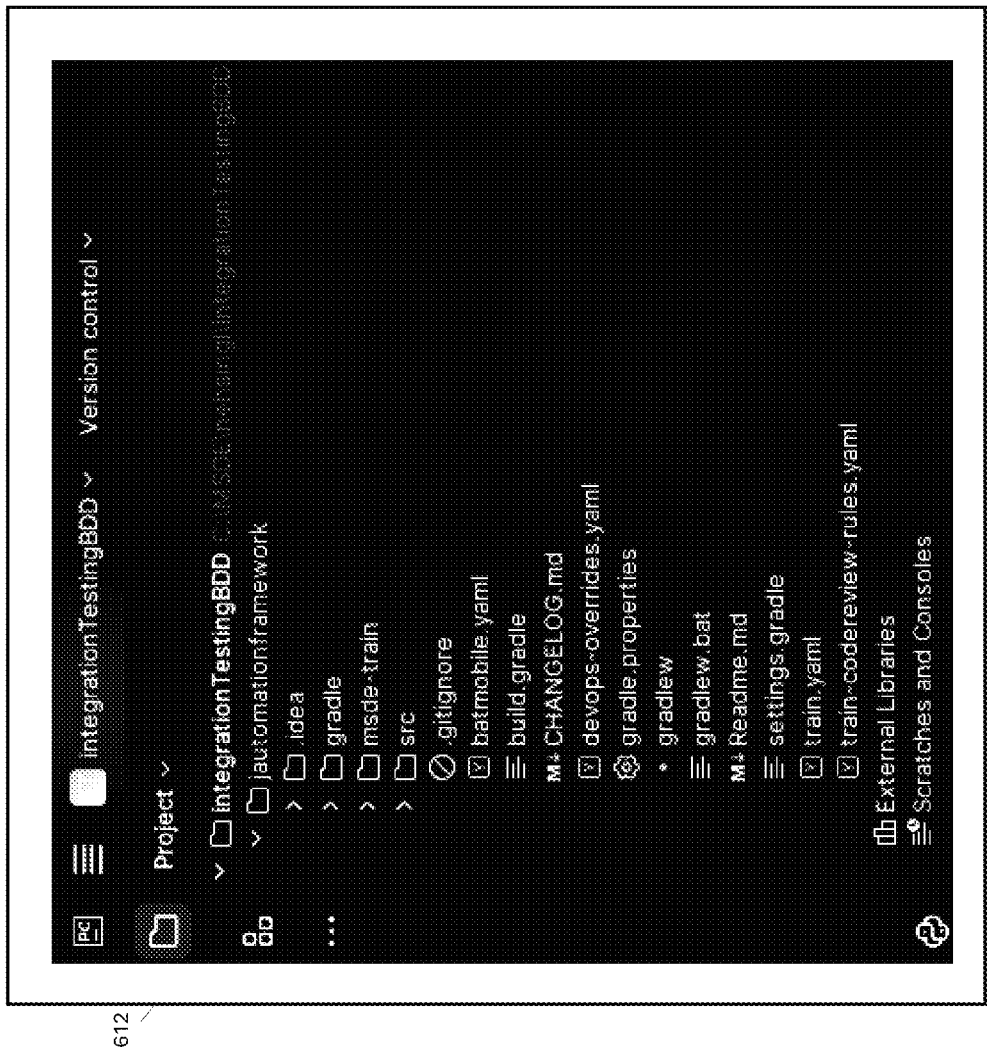
FIGS. 6A-6E illustrate example display screens, in accordance with an example implementation of the present disclosure.

In the examples shown in FIGS. 6A-6E, selectable options are presented for users to navigate to nested layers of options. FIG. 6A illustrates an example display screen 600 operating in a first state 612, containing selectable options (e.g., > and v) for accessing respective levels containing categories, objects, or the like) in connection with generating an example BDD application testing framework. including, among others, selectable options for accessing JAVA in an INTELLIJ IDEA, GRADLE, MICROSOFT SQL, and source code ("src") files and/or repositories including deliberately untracked files (GITIGNORE), YAML files, GRADLE, MARKDOWN (.md) files, batch files, or the like.

Figure 6B:
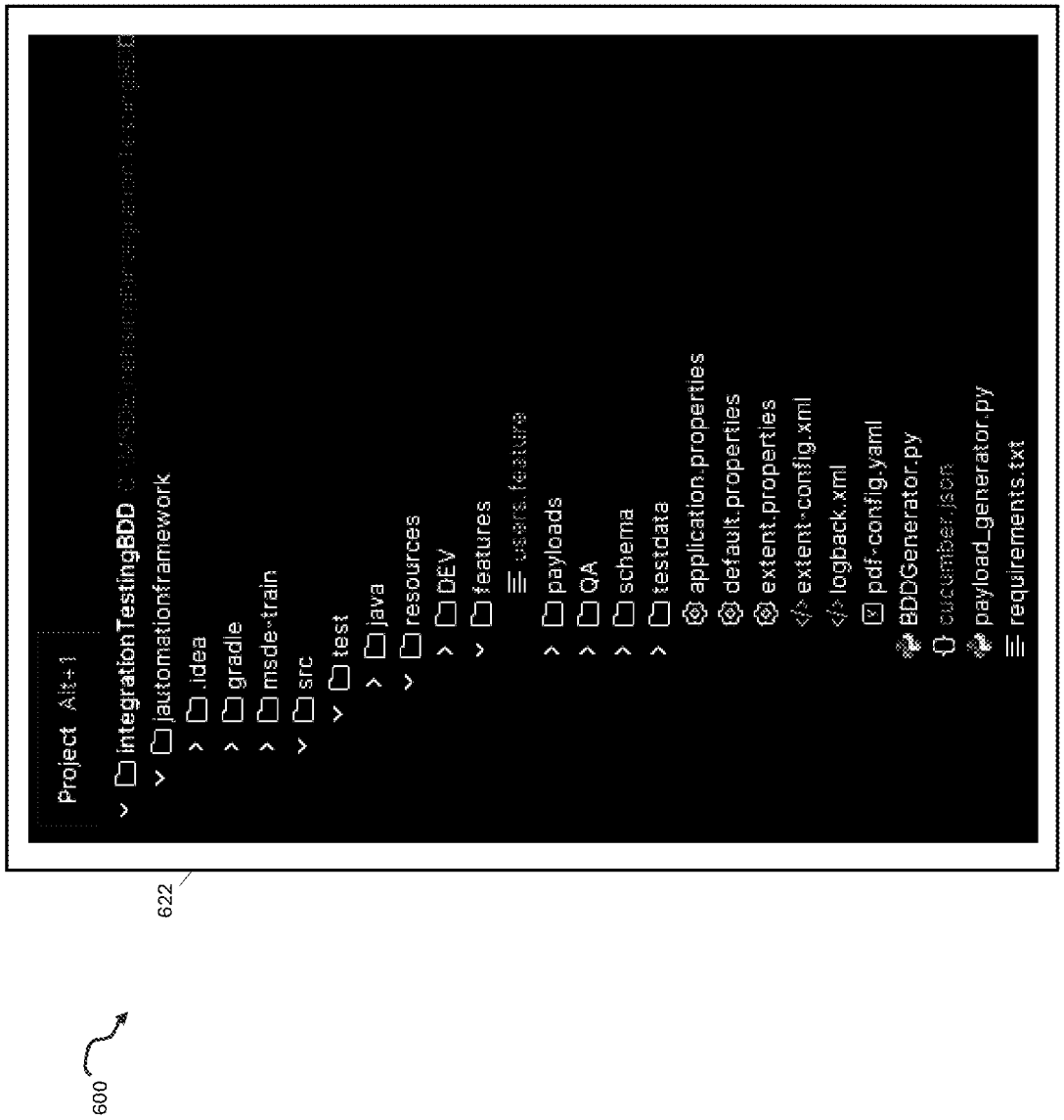

Continuing with reference to an example implementation of the present disclosure, FIG. 6B illustrates display screen 600 in a second state 622, in which the source code ("src") option has been selected and options are provided for a respective BDD automation framework, including JAVA, resources, payloads, QA, schemas, test data, PYTHON scripts, text files, or the like. In FIG. 6B, the Features option has been selected, revealing selectable option for a respective user's feature file, such as for editing.

Figure 6C:
Figure 6D:
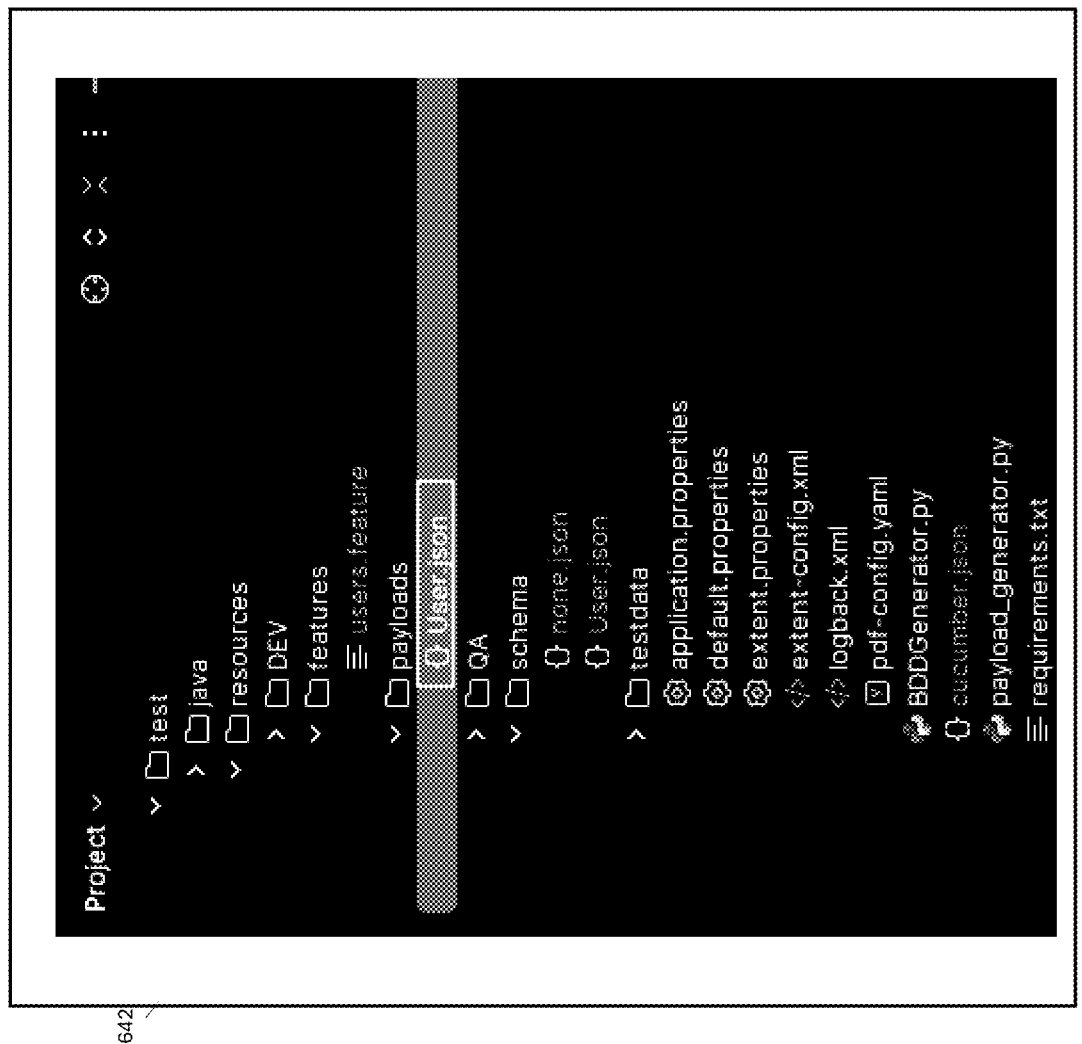
Figure 6E:
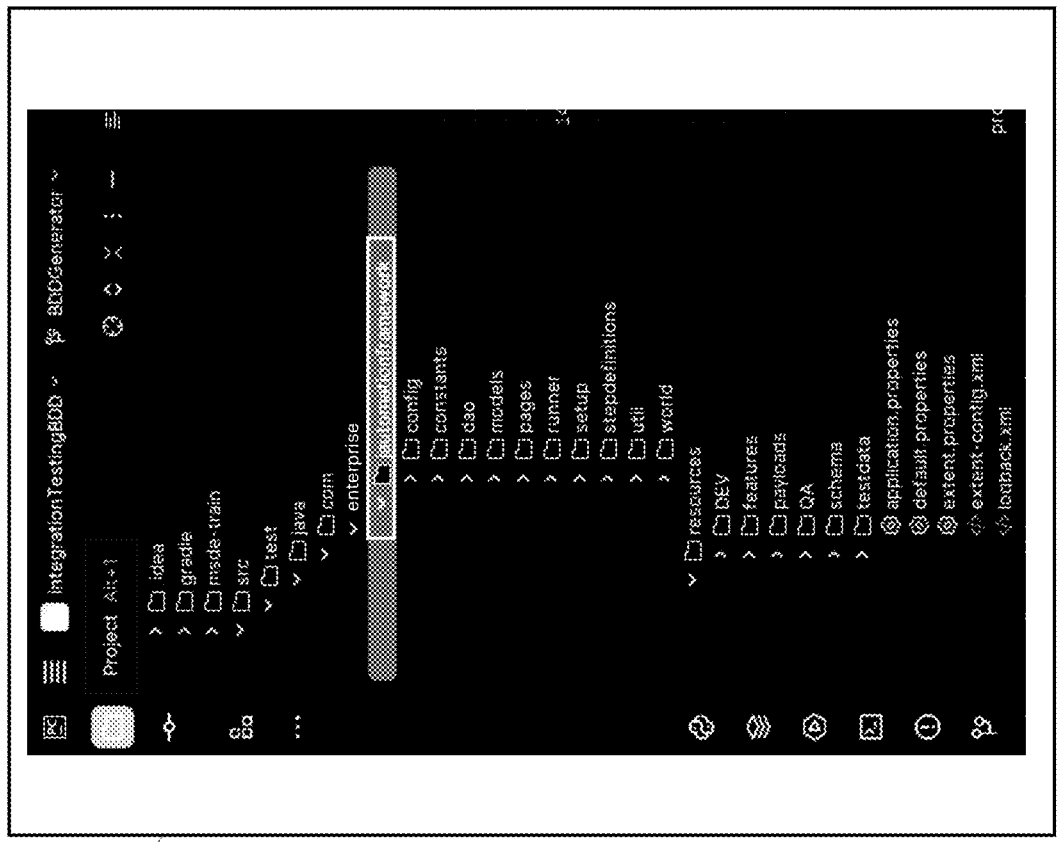

FIG. 6C illustrates display screen 600 in a third state 632, in which two example schemas formatted as JSON files are uncovered, including "none.json" and "User.json," following selection of the schema option. FIG. 6D illustrates display screen 600 in a fourth state 642, in which an example schema formatted as a JSON file ("User.json") is uncovered following selection of the schema option. FIG. 6E illustrates display screen 600 in a fifth state 652, in which an example JAVA automation framework developed in the enterprise in accordance with the teachings herein is revealed. In the example shown in FIG. 6E, options are uncovered for developing and editing configurations ("config"), constants, decentralized automation organization ("dao"), models, pages, runner, setup, step definitions, utilities, and world. schema formatted as a JSON file ("User.json") is nested and revealed following selections of below the "src" "test" "java" "com" and "enterprise" automation framework options, provided in accordance with an example implementation.

As illustrated in FIG. 6E, selection of any of these options (e.g., ">") under the "enterprise" category reveals additional respective options and/or objects. Highlighted options, such as config. constants, DAO, or the like, represent different parts of framework, in which the framework is an end-result for the configuration being built. For example, "Config" represents an example package containing various configurations, such as MONGO config, KAFKA config, or others. "Constants can represent any constants across a framework, which are to be stored. While certain constants can be identified for storage by default, "Constants" can be scalable and users can add or remove constants in respective implementations. "DAO" represents an example package that contains classes to connect to database. "Models" represents an example package to maintain all POJO classes. In one or more implementations, no classes are assigned to "Models" by default, and users can assign classes to "Models" on demand. "Runner" represents a run configuration for the framework. "Util" contains utilities. For example, a "MONGO" configuration will include MONGO utilities entered in the "Util" part of the framework. "World" represents a class that have methods associated with a respective "Util" entry, as each respective "Config" has a world class including respective methods therefor.

FIGS. 7A-7D illustrate an example display screen in various states, associated with BDD AUTOMATION INITIALIZATION toolkit 100, which include navigable project options section 702 (e.g., corresponding to examples of options illustrated in FIGS. 6A-6E), and respective sections, provided pursuant to selections of options, such as for editing/modifying a generated document, made in project options section 702.

Figure 7A:
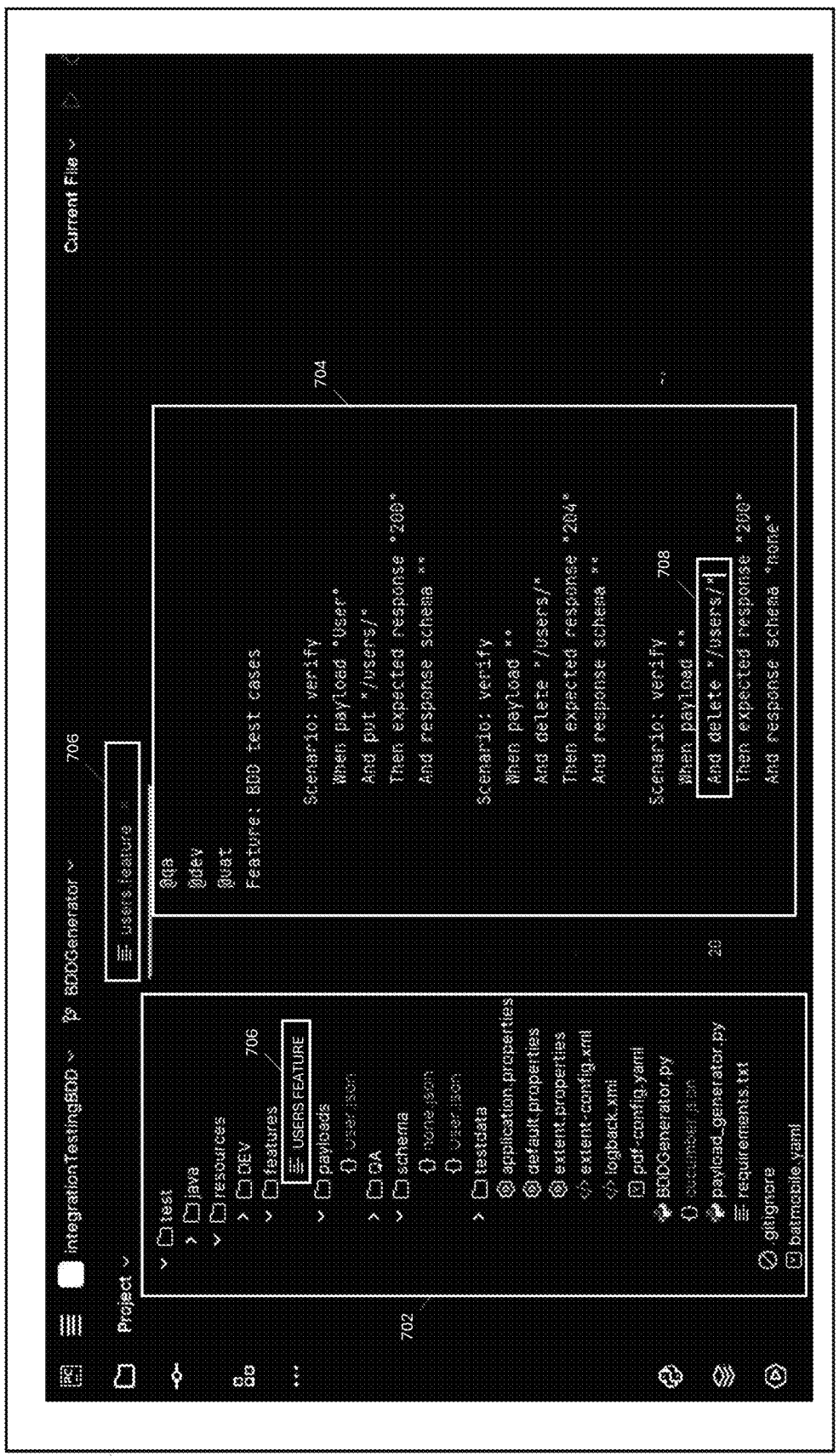
FIGS. 7A-7D illustrate an example display screen in various states, in accordance with an example implementation of the present disclosure.
Figure 7B:
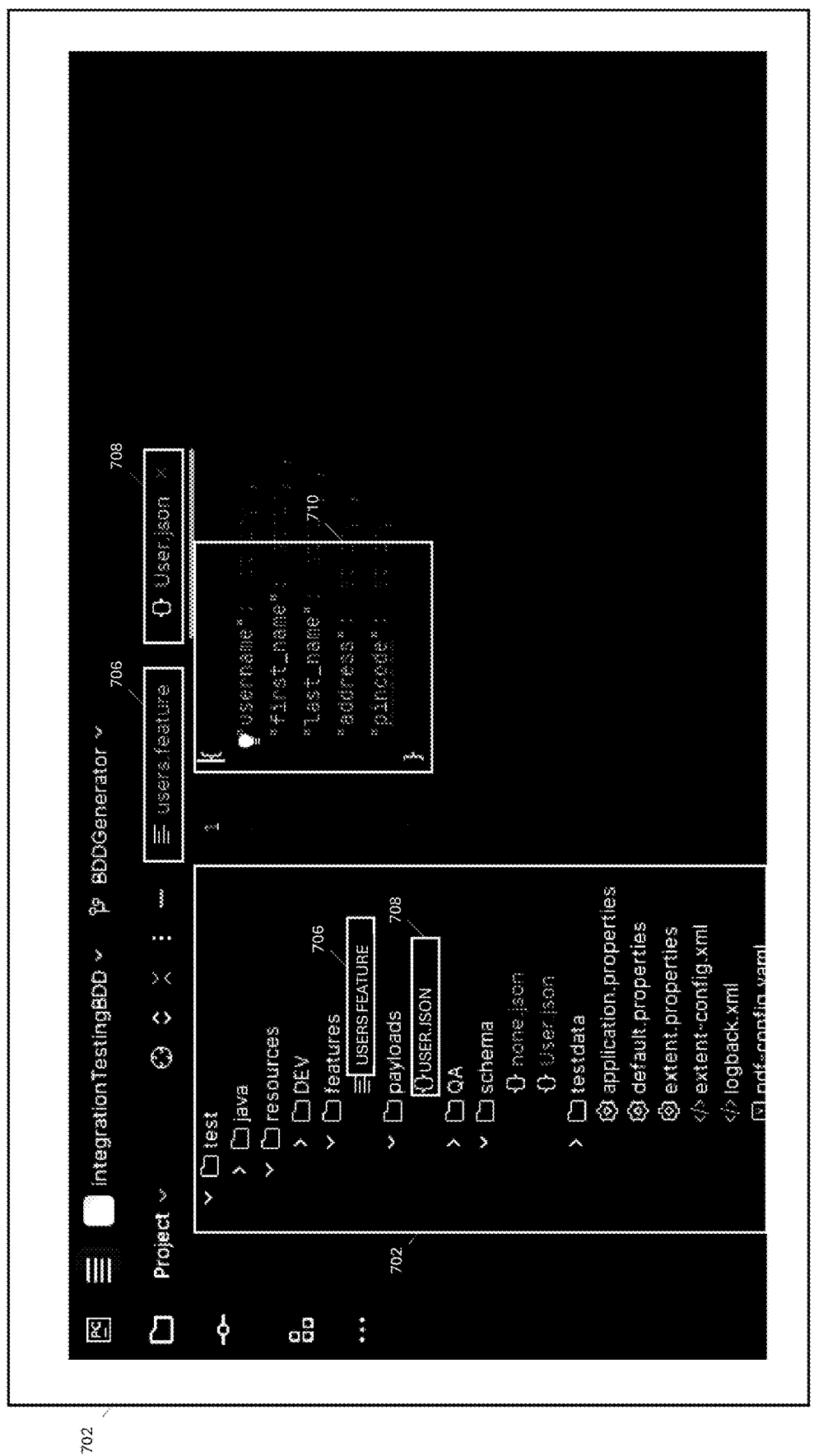
Figure 7C:
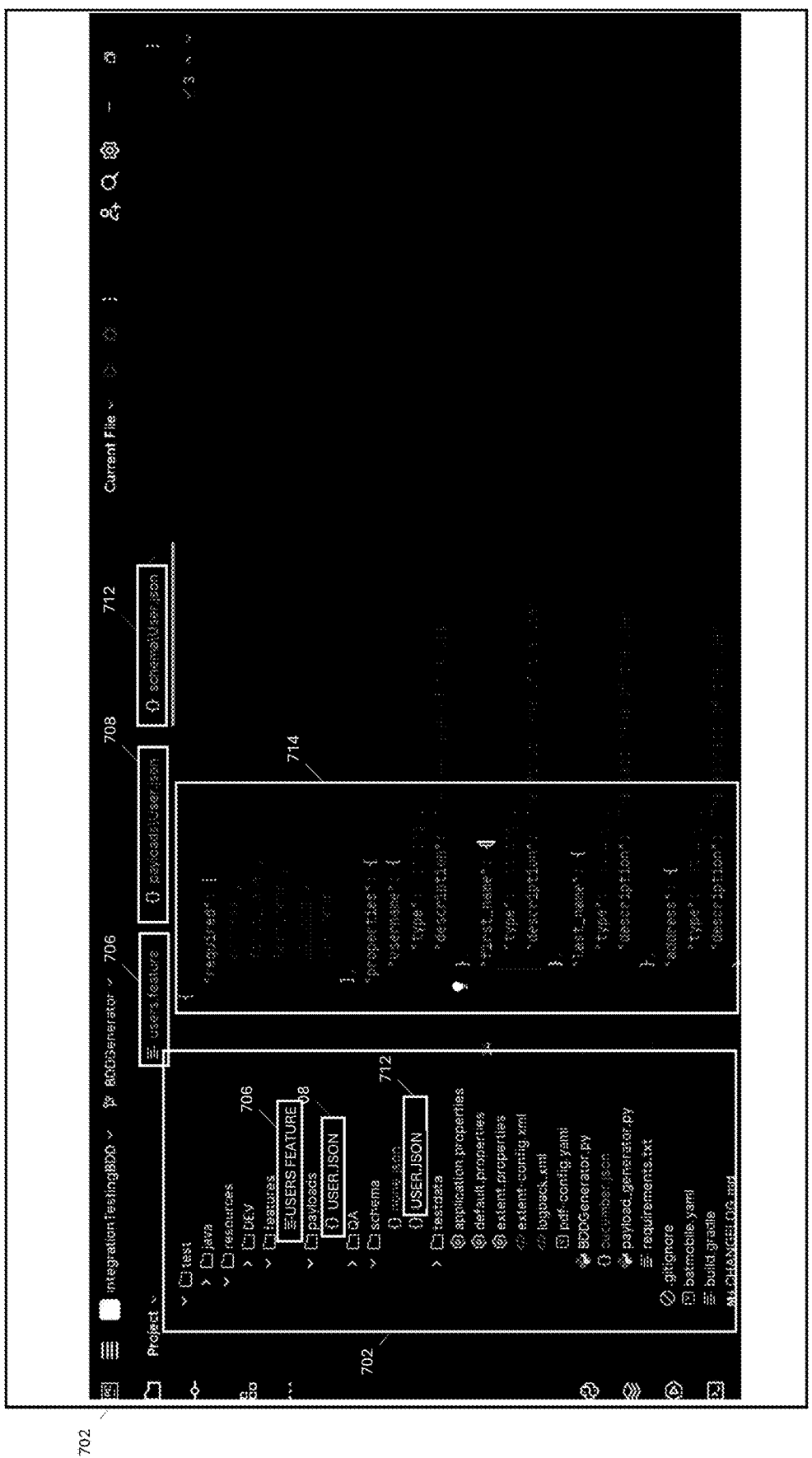
Figure 7D:
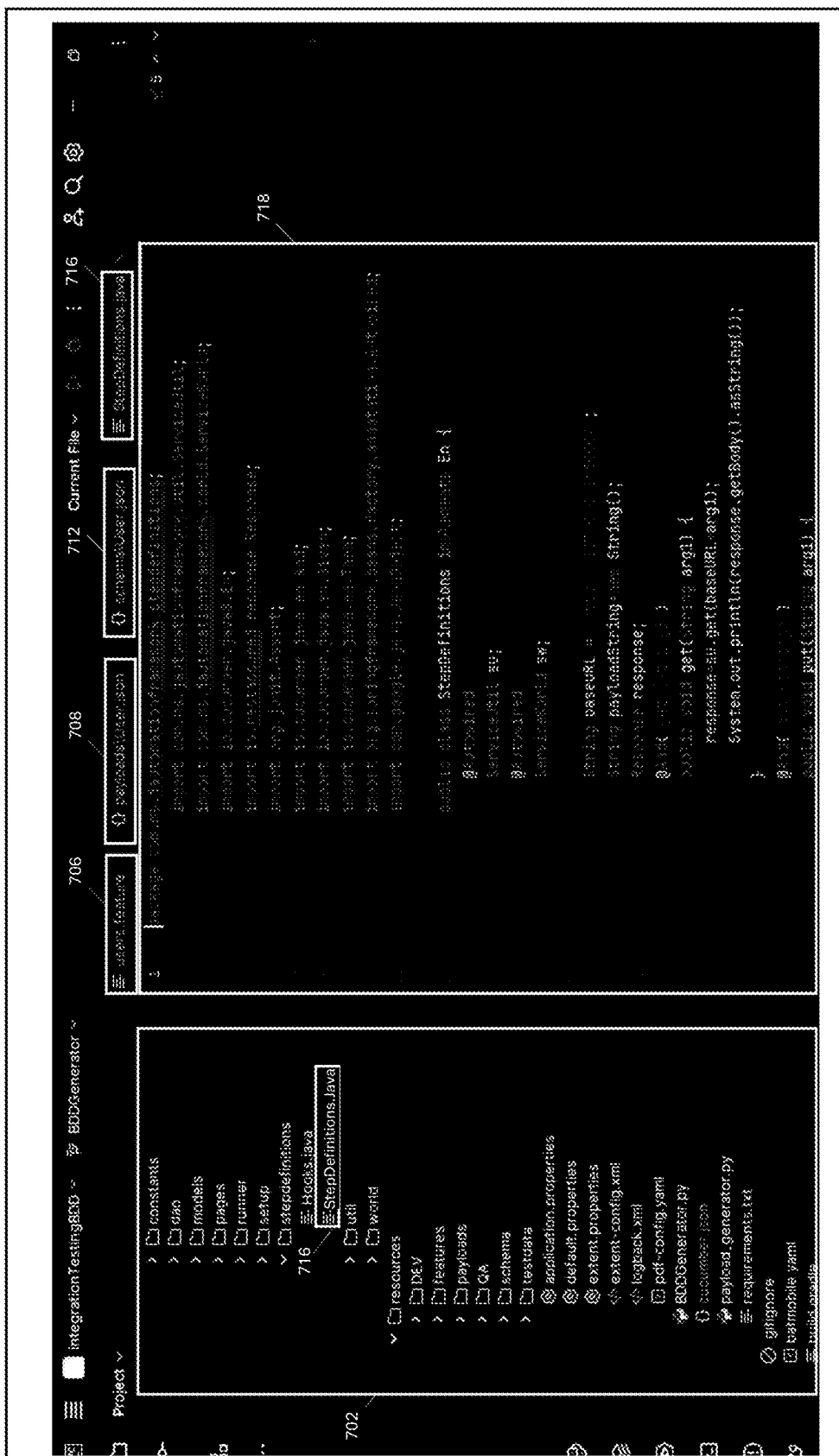

FIG. 7A illustrates project options section 702, in which a feature file, USERS FEATURE 706, has been selected. File editing section 704 supports editing the respective feature file, including at portion 708 in which the line associated "And delete/users/'" is being updated in the selected feature file. FIG. 7B illustrates project options section 702, in which data payloads selection, USERS.JSON 708 has been selected and editing section 710 identifies the structure of the data payload, including field labels for username, first name, last name, address, and pin code are shown. FIG. 7C illustrates project options section 702, in which data payloads selection, USERS.JSON 708 has been selected and editing section 710 identifies the structure of the data payload, including field labels for username, first name, last name, address, and pin code are shown. FIG. 7D illustrates project options section 702, in which step definitions selection, STEPDEFINITIONS.JAVA 716 has been selected. Also shown in FIG. 7D, editing section 718 is provided for editing corresponding step definition code.

Accordingly, as illustrated in display screens 6A-6E and 7A-7D, the BDD automation initialization provides a dynamic interface enabling access to and editing options for categories of objects and objects themselves assembled via a tool for BDD development, testing, and implementation.

Figure 8A:
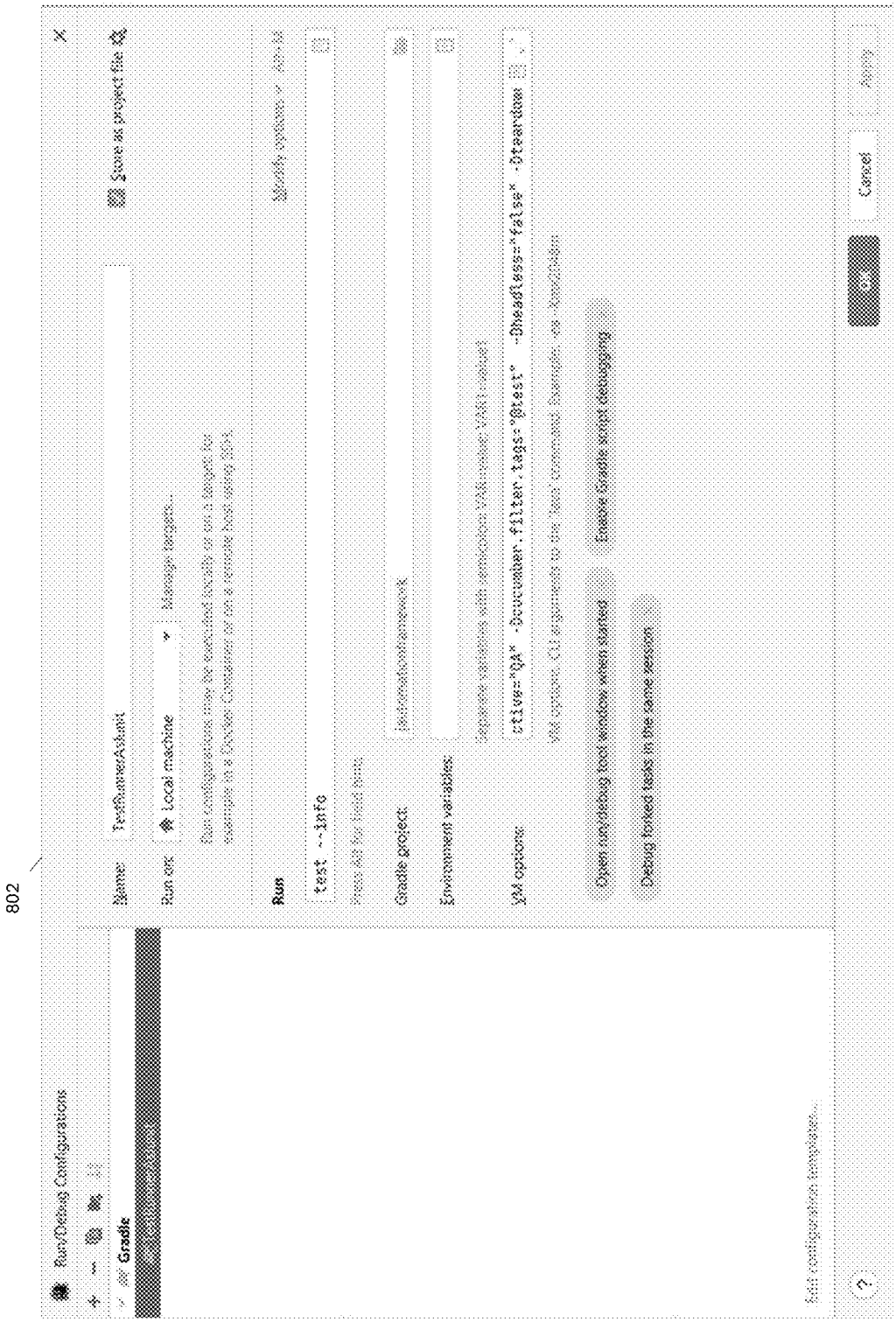
FIGS. 8A and 8B illustrate example display screens showing data entry forms associated with a JAVA run configuration and a GRADLE configuration, in accordance with an example implementation of the present disclosure.
Figure 8B:
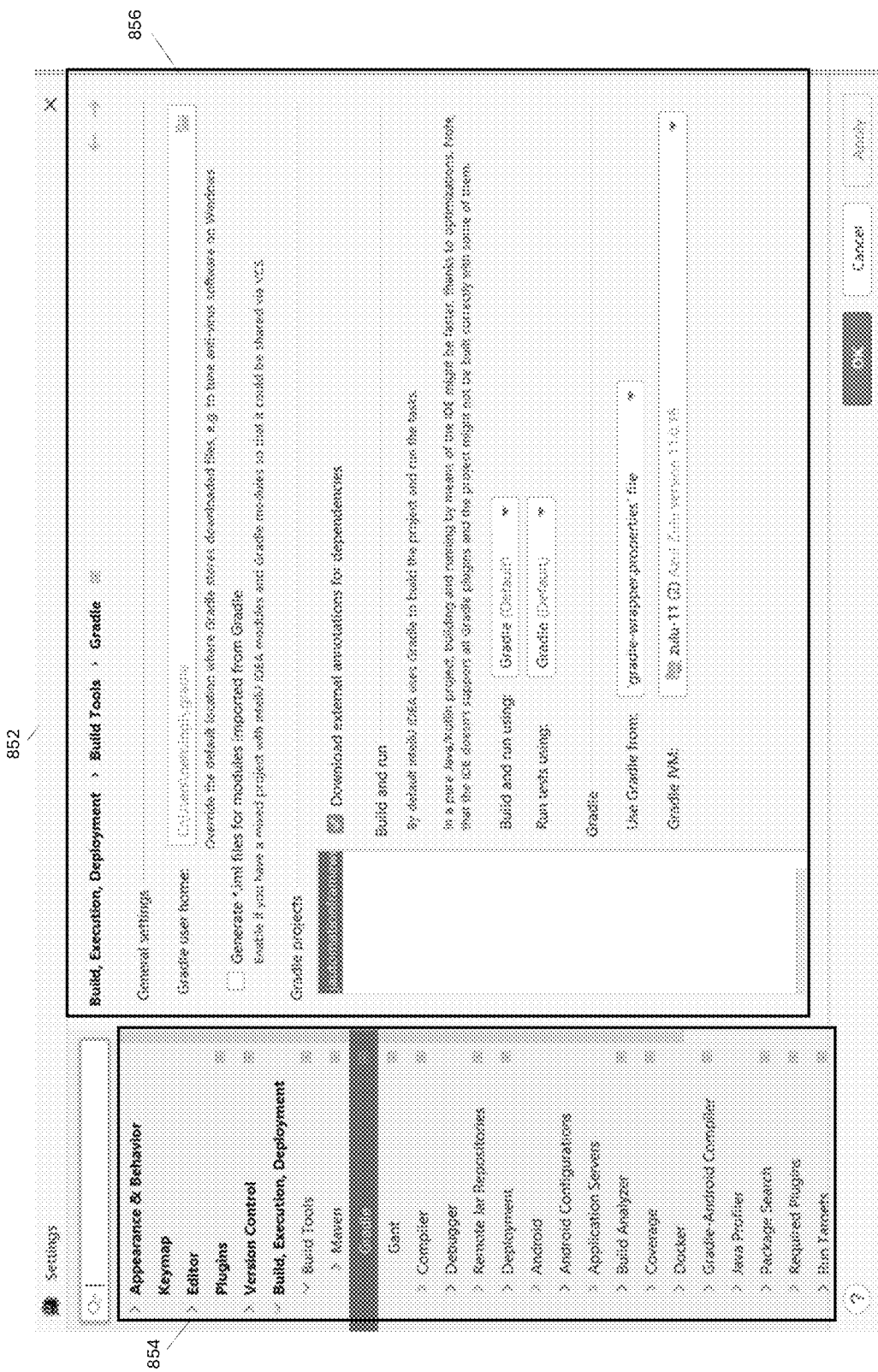

FIGS. 8A and 8B illustrate example display screens showing data entry forms associated with a JAVA run configuration and a GRADLE configuration. In FIG. 8A, for example, display screen 802 provides run/debug configurations for a GRADLE project, including selectable options for entering a project name, a target device for running, a command line run command, environment variables, and virtual machine ("VM") options. Further, run options are provided, such as for opening run/debug tool window once started, enabling GRADLE script debugging, and for debugging forked tasks during a respective session.

FIG. 8B, for example, illustrates GRADLE additional tool options in connection with steps associated with a GRADLE project. In the example display screen 852 shown in FIG. 8B, selectable options section 854 is provided for appearance & behavior keymap, editor plugins, version control, and build, execution, deployment options. In the example shown in FIG. 8B, the option for build, execution, deployment was selected and an option for GRADLE under build tools. Other build tools are supported, such as MAVEN, as illustrated in FIG. 8B. Other build, execution, deployment tools provided in accordance with the implementation shown in section 854 in FIG. 8B include compiler, debugger, remote JAR repositories, deployment, application servers, build analyzer, coverage, DOCKER, GRADLE-ANDROID COMPILER, JAVA profiler, package search, required plugins, and run targets.

Continuing with reference to the example display screen 852, under the build, execution, deployment option in section 854 the option for GRADLE has been selected. Settings section 856 provides options for providing the drive/path home location and a checkbox for generating .iml files for mixed projects (e.g., including IDEA modules and GRADLE modules). Further, options are provided for downloading external annotations for dependencies, and build/run options using GRADLE or other build tool. Further, options are provided for defining (e.g., selecting) a respective properties file and a respective JAVA VM.

Thus, as shown and described with reference to FIGS. 8A and 8B, options are provided for options associated with aspects of BDD automation generation, testing, and implementation.

FIG. 9 is a high-level flow chart illustrating example steps that are associated with BDD automation generation, testing, and implementation, in accordance with an example implementation of the present disclosure. It should be appreciated that several of the logical operations described herein are implemented (1) as a sequence of computer implemented acts or program modules running on a communication device and/or (2) as interconnected machine logic circuits or circuit modules within a communication device. The implementation is a matter of choice, which can depend on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

In the example steps shown in FIG. 9, the process begins at step 902 and a command line (e.g., a batch file) interface executes. Thereafter, at step 904 a GRADLE project is generated which is populated with BDD files. Thereafter, at step 906, using an interface provided in accordance with the present disclosure, aspects of the GRADLE project are processed, such as by modifying files and variables associated therewith. Furthermore, at step 908, a data payload is populated, such as a JSON file, and testing and implementation proceeds.

Accordingly, and as shown and described herein, the present disclosure provides a combination of features in a technical framework that is robust and adaptable to generate automation designed for testing and operating in discreet applications. An interactive development and testing interface is provided, including for BDD development, testing, and implementation. For example, API schema validation can be provided to ensure integrity of an API in respective computing environments. Metrics integration can track efforts and progress of automation. Software testing metrics can be vital for team members in agile development, including developers, testers, quality assurance personnel, and project managers. Activities can be measured, reported, and tracked, thereby ensuring improved testing as a function of respective software testing metrics.

Once configured, a SWAGGER JSON file or link can be used, such as via a command line interface, for generating applications that, when executed by one or more computing devices, provide various BDD automation, e.g., testing automation. Using the technology shown and described herein, development sprints can be transformed, bottlenecks eliminated, and operational teams empowered to deliver high-quality software consistently.

Figure 10:
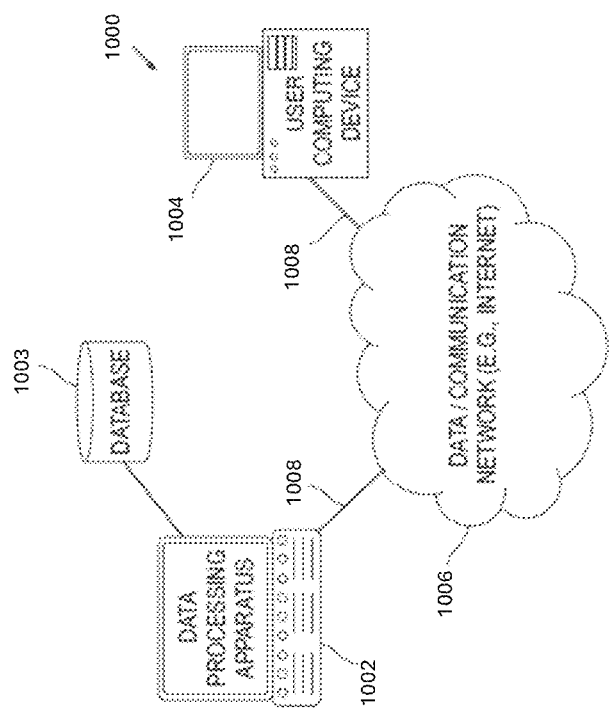
FIG. 10 is a diagram that shows an example hardware arrangement that is configured for providing the systems and methods disclosed herein.

Referring to FIG. 10, a diagram is provided that shows an example hardware arrangement that is configured for providing the systems and methods disclosed herein and designated generally as system 1000. System 1000 can include one or more information processors 1002 that are at least communicatively coupled to one or more user computing devices 1004 across communication network 1006. Information processors 1002 and user computing devices 1004 can include, for example, mobile computing devices such as tablet computing devices, smartphones, personal digital assistants or the like, as well as laptop computers and/or desktop computers, server computers and mainframe computers. Further, one computing device may be configured as an information processor 1002 and a user computing device 1004, depending upon operations being executed at a particular time.

With continued reference to FIG. 10, information processor 1002 can be configured to access one or more databases 1003 for the present disclosure, including source code repositories and other information. However, it is contemplated that information processor 1002 can access any required databases via communication network 1006 or any other communication network to which information processor 1002 has access. Information processor 1002 can communicate with devices comprising databases using any known communication method, including a direct serial, parallel, universal serial bus ("USB") interface, or via a local or wide area network.

User computing devices 1004 can communicate with information processors 1002 using data connections 1008, which are respectively coupled to communication network 1006. Communication network 1006 can be any data communication network. Data connections 1008 can be any known arrangement for accessing communication network 1006, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 1004 preferably have the ability to send and receive data across communication network 1006, and are equipped with web browsers, software disclosures, or other means, to provide received data on display devices incorporated therewith. By way of example, user computing device 1004 may be personal computers such as Intel Pentium-class and Intel Core-class computers or Apple Macintosh computers, tablets, smartphones, but are not limited to such computers. In addition, the hardware arrangement of the present invention is not limited to devices that are physically wired to communication network 1006, and that wireless communication can be provided between wireless devices and information processors 1002.

System 1000 preferably includes software that provides functionality described in greater detail herein, and preferably resides on one or more information processors 1002 and/or user computing devices 1004. One of the functions performed by information processor 1002 is that of operating as a web server and/or a web site host. Information processors 1002 typically communicate with communication network 1006 across a permanent i.e., un-switched data connection 1008. Permanent connectivity ensures that access to information processors 1002 is always available.

Figure 11:
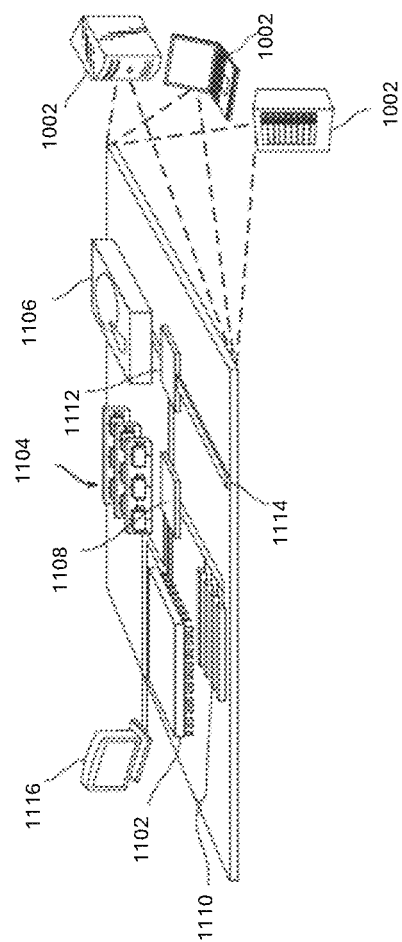
FIG. 11 shows an example information processor and/or user computing device that can be used to implement the techniques described herein.

FIG. 11 shows an example information processor 1002 and/or user computing device 1004 that can be used to implement the techniques described herein. The information processor 1002 and/or user computing device 1004 is intended to represent various forms of digital computers, such as laptops, desktops, workstations, personal digital assistants, servers, blade servers, mainframes, and other appropriate computers. The components shown in FIG. 11, including connections and relationships, and their functions, are meant to be exemplary only, and are not meant to limit implementations of the inventions described and/or claimed in this document.

As shown in FIG. 11, the information processor 1002 and/or user computing device 1004 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the information processor 1002 and/or user computing device 1004, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the information processor 1002 and/or user computing device 1004. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the information processor 1002 and/or user computing device 1004. In some implementations, the storage device 1106 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 can be configured to manage bandwidth-intensive operations, while the low-speed interface 1112 can be configured to manage lower bandwidth-intensive operations. Of course, one of ordinary skill in the art will recognize that such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In an implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Any of the methods described herein may, in corresponding embodiments, be reduced to a non-transitory computer readable medium (CRM, such as a disk drive or flash drive) having computer instructions stored therein that, when executed by a processing circuit, cause the processing circuit to carry out an automated process for performing the respective methods.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for agile software development, testing, and implementation, the method comprising:

accessing, by at least one computing device configured by executing programming instructions stored on processor, at least one input file;

processing, by the at least one computing device, the at least one input file to generate an application framework including a plurality of files, wherein the plurality of files are arranged in respective folders;

providing, by the at least one computing device, an interactive interface including selectable options associated with the respective folders for editable access to the plurality of files;

providing, by the at least one computing device via the interactive interface, editable access to each of the plurality of files;

receiving, by the at least one computing device via the interactive interface, at least one edit to at least one of the plurality of files;

generating, by the at least one computing device, a testing case of the generated application framework, wherein the testing case includes step definition files;

testing, by the at least one computing device, the generated application framework by stepping through automation provided by the generated application framework as a function of the step definition files; and generating, by the at least one computing device, reporting associated with the testing of the generated application framework.

2. The method of claim 1, wherein the generated application framework includes at least one of a data payload, an application programming interface, and a schema.

3. The method of claim 2, wherein the data payload is formatted in a JSON file and the application programming interface includes representation state transfer.

4. The method of claim 2, wherein the application programming interface is generated using SWAGGER.

5. The method of claim 1, further comprising generating, by the at least one computing device, a plurality of feature files including at least two of:
   an actuator feature;
   a dashboard controller feature;
   a delegated-reporting controller feature;
   an enterprise data governance search controller feature;
   an entitlements controller feature;
   a feature flag controller feature;
   a metadata controller feature;
   a party coded controller feature;
   a party manager controller feature;
   a virtual assistant controller feature; and
   a workspace controller feature.

6. The method of claim 5, wherein the application framework is generated as a function of a command line interface and the input file.

7. The method of claim 1, further comprising:
   providing, by the at least one computing device, as a function of the generated application framework and the testing case, metrics traceability.

8. The method of claim 1, further comprising:
   providing, by the at least one computing device, as a function of the generated application framework and the testing case, schema verification.

9. The method of claim 1, further comprising:
   adding, by the at least one computing device, as a function of the testing case, assertions to the generated application framework.

10. The method of claim 1, wherein the generated application framework is a GRADLE project.

11. A computer-implemented system for agile software development, testing, and implementation, the system comprising:
at least one computing device configured by executing programming instructions stored on processor, wherein the at least one computing device is configured for:
accessing at least one input file;
processing the at least one input file to generate an application framework including a plurality of files, wherein the plurality of files are arranged in respect folders;
providing an interactive interface including selectable options associated with the respective folders for editable access to the plurality of files;
providing, via the interactive interface, editable access to each of the plurality of files;
receiving, via the interactive interface, at least one edit to at least one of the plurality of files;
generating a testing case of the generated application framework, wherein the testing case includes step definition files;
testing the generated application framework by stepping through automation provided by the generated application framework as a function of the step definition files; and
generating reporting associated with the testing of the generated application framework.

12. The system of claim 11, wherein the generated application framework includes at least one of a data payload, an application programming interface, and a schema.

13. The system of claim 12, wherein the data payload is formatted in a JSON file and the application programming interface includes representation state transfer.

14. The system of claim 12, wherein the application programming interface is generated using SWAGGER.

15. The system of claim 11, wherein the at least one computing device is further configured for:
generating a plurality of feature files including at least two of:
an actuator feature;
a dashboard controller feature;
a delegated-reporting controller feature;
an enterprise data governance search controller feature;
an entitlements controller feature;
a feature flag controller feature;
a metadata controller feature;
a party coded controller feature;
a party manager controller feature;
a virtual assistant controller feature; and
a workspace controller feature.

16. The system of claim 15, wherein the application framework is generated as a function of a command line interface and the input file.

17. The system of claim 11, wherein the at least one computing device is further configured for:
providing, as a function of the generated application framework and the testing case, metrics traceability.

18. The system of claim 11, wherein the at least one computing device is further configured for:
providing, as a function of the generated application framework and the testing case, schema verification.

19. The system of claim 11, wherein the at least one computing device is further configured for:
adding, as a function of the testing case, assertions to the generated application framework.

20. The system of claim 11, wherein the generated application framework is a GRADLE project.

* * * * *